United States Patent [19]

Hucke

[11] 4,425,316

[45] Jan. 10, 1984

[54] DENSIFIED CARBONACEOUS BODIES WITH IMPROVED SURFACE FINISHES

[75] Inventor: Edward E. Hucke, Ann Arbor, Mich.

[73] Assignee: Union Oil Company of California, Los Angeles, Calif.

[21] Appl. No.: 305,777

[22] Filed: Sep. 25, 1981

[51] Int. Cl.³ .................. C01B 31/02; C01B 31/04
[52] U.S. Cl. ................................ 423/448; 264/295; 423/445; 423/449
[58] Field of Search .................. 423/445, 448, 449; 264/29.1, 29.5; 427/228

[56] References Cited

U.S. PATENT DOCUMENTS

| | | | |
|---|---|---|---|
| 3,628,984 | 12/1971 | Ishikawa et al. | 423/449 |
| 3,859,421 | 1/1975 | Hucke | 423/449 X |
| 4,226,900 | 10/1980 | Carlson et al. | 427/228 |

FOREIGN PATENT DOCUMENTS 677901  1/1964  Canada ........................... 427/228

*Primary Examiner*—Edward J. Meros
*Attorney, Agent, or Firm*—Dean Sandford; Gregory F. Wirzbicki; Robert A. Franks

[57] ABSTRACT

A liquid formulation containing furfural, para toluene sulfonic acid and tetraethylene glycol is impregnated into fine grained, isotropic graphite bodies and then polymerized and pyrolyzed. That increases the density of the impregnated body and improves its surface finish.

10 Claims, No Drawings

DENSIFIED CARBONACEOUS BODIES WITH IMPROVED SURFACE FINISHES

In one aspect this invention relates to novel, improved techniques for densifying and improving the surface finish of fine grained, isotropic graphites.

The invention also relates, in a second aspect, to novel, improved, densified, carbonaceous artifacts which have a superior surface finish and are obtained by impregnating a fine grained, isotropic graphite with a liquid impregnant and subsequently first polymerizing and then pyrolyzing or carbonizing the impregnant.

And, in two other aspects, my invention relates to novel, improved liquid impregnants for use in the techniques of treating fine grained, isotropic graphites identified above and to the novel artifacts impregnated therewith.

Fine grain, molded graphite parts have residual porosity which detracts from performance in some applications such as those in which they are used as crucibles and the like. For example this porosity generally admits oxidizing media and allows the gaseous products of oxidation to leave the body thereby generally lowering its oxidation resistance.

Also, in the case of certain crucibles for melting liquid metals, the surface porosity allows some penetration of the liquid into the crucible and thereby contributes to degradation of the crucible.

Also, graphite parts in contact with glass at high temperature are degraded by glass entering the surface pores of the crucible. This causes sticking and subseqent breaking away of the crucible surface when the contact is broken. The pores also contribute to a general loss of strength.

In order to overcome these difficulties a wide variety of impregnation processes have been practiced in the graphite industry.

For examle decomposition of a gas phase to close interconnected pores and prevent unwanted penetration of a graphitic material is suggested in U.S. Pat. No. 3,084,394 to Bickerdike.

Impregnation of carbon and other porous bodies with furfural alcohol to fill their pores is described by I. S. Goldstein and W. A. Dreker in Industrial Engineering Chemistry, 52, 57 (1960).

In U.S. Pat. No. 3,628,984, Ishikawa and Teranishi disclose the use of a solution of furfural and acetone with two catalytic additives to impregnate graphite bodies in order to reduce porosity and improve properties obtained after the body is cured in an acid bath and subsequently carbonized. Unfortunately, both catalysts and the acetone are required to achieve the desired results.

In my U.S. Pat. No. 3,859,421, I disclose a group of liquids that can be cast into pyrolyizable, free standing bodies with highly controlled systems of porosity. I have recently and unexpectedly discovered that certain of these liquids can also be used to impregnate fine grained, isotropic graphites. The subsequent polymerization and pyrolyzation of those liquid impregnants reduces the susceptibility of the impregnated graphitic body to degradative attack by increasing its density and decreasing the number of interconnected pores opening onto the surface of the body.

That fine grained, isotropic graphites can be successfully treated by the technique just described is important because technical demands for higher strength and quality, etc. and the elimination of anisotropic characteristics have led to the increasing use of those materials.

Fine grained graphites such as that manufactured and sold by Poco Graphite Company have grain sizes of about 0.001 inch and residual, interconnected pores typically about 0.4 micron in size. These fine grained, small pore graphites yield a superior surface finish when they are machined.

However, I have found that even these fine pored graphites can be impregnated, and surface finish and product performance further improved, using the novel impregnating techniques and impregnants disclosed herein.

My novel process for improving the properties of fine grained, isotropic graphites involves the following steps:

(1) Mixing furfural or furfural alcohol or a mixture of those compounds and various glycols at room temperature with an acid polymerization agent;
(2) Sumbersing the the graphitic body to be impregnated in the resulting impregnant;
(3) Polymerizing the liquid impregnant in the pores of the graphitic body by holding it at a desired temperature for an appropriate time; and
(4) Heating the graphite body with the cured resin within it to pyrolyzation temperature to convert the carbon in the impregnant to an inorganic form.

None of the above steps, or indeed the combination of them, as thus broadly stated is novel in the art of impregnating graphite bodies. However, the impregnating liquids that I use are novel and suited to give exceptional and unexpected results. Specifically, the prior art uses furfural alcohol, furfural alcohol resins, or furfural as impregnants with the aim of producing a carbon within the pores of a carbon body in order to eliminate the pores within it. These materials typically produce a carbon within the pores that is cracked due to the large shrinkage it undergoes upon carbonization or pyrolyzation. Exemplary of the processes that would be expected to produce carbons with this susceptibility are those disclosed in the Bickerdike patent and the Goldstein article identified above.

Ishikawa et al. (see U.S. Pat. No. 3,628,904) were able to overcome this difficulty to some extent by using an impregnant composed of furfural mixed with acetone and two catalysts.

However, upon pyrolyzation the impregnants I employ from a carbon in the pores of the impregnated body that has within it a much finer pore structure than any Ishikawa was able to produce. This carbon has excellent strength and hardness.

The pores in the impregnant based carbon I produce are in the range of 100–500 angstroms (0.01 to 0.05 microns) and are interconnected, thereby allowing an escape route for the gases given off during carbonization. This is important as the cracking upon pyrolysis to which prior art impregnants were susceptible is thereby avoided.

The liquid impregnants I employ are also very low in viscosity and completely wet the graphite allowing even the finest of the pores in the original graphite body to be filled with the impregnant. They furthermore undergo much less linear shrinkage (18 to 22%) during carbonization than does pure furfural alcohol of furfural (35–45%). In addition I employ no volatile components such as acetone. The presence of volatile compounds in the impregnant is undesirable as such constituents tend to leave the body by evaporation, thereby drawing out the resin to the surface. This is undesirable both because it leaves an unwanted "skin" on the surface of the carbonaceous body and because pores in that body are left unfilled, thereby detracting from the very properties the impregnant is employed to provide.

I have found that one excellent liquid impregnant for the fine grained, isotropic graphite manufactured by Poco Graphite Co. can be made by dissolving para toluene sulfonic acid (catalyst) in tetraethylene glycol and then adding furfural until the latter composes 60 volume % of the solution (the amount of para toluene sulfonic acid is 15 weight % of the furfural).

Furfural alcohol may be substituted for furfural in whole or in part in the foregoing mixture, and other polyethylene or polypropylene glycols may be substituted in whole or in part for the tetraethylene glycol. Other acid catalysts known in the art such as phosphoric and hydrochloric acids may be used in place of the para toluene sulfonic acid. The exact ratios of ingredients is not critical as long as they are within the ranges specified below:

| Constituent | |
|---|---|
| Acid Catalyst | 2-20 Weight % of Furfural/Furfural Alcohol |
| Furfural/Furfural Alcohol | 40-85 Volume % |
| Glycol(s) | Balance |

The times and temperatures employed to first polymerize and then pyrolyzize the liquid impregnant can vary widely, depending upon the composition of the impregnant. In general, the guidelines set forth in my U.S. Pat. No. 3,859,421 for the consolidation and pyrolyzation steps described therein can be followed; and that patent is, accordingly, incorporated herein by reference.

From the foregoing it will be apparent to the reader that one important and primary object of the present invention resides in the provision of novel, improved, densified components and artifacts composed of fine grained, isotropic graphites which have a superior surface finish and are impregnated with inorganic carbon of a yet finer, extremely small grained nature which is hard and strong and has interconnected pores and is highly resistant to cracking.

Another important, primary object of my invention resides in the provision of methods for making components and artifacts of the character identified in the preceding object.

Still another important, and primary, object of the invention is to provide novel impregnants for use in the process identified above which are capable of wetting isotropic graphites, and consequentially, capable of filling even the finest pores of the structures into which they are impregnated.

And yet another important, and primary, object of the invention is to provide novel impregnated structures which can be converted, by the application of heat, into components and artifacts of the character identified in the first of the foregoing objects with only minimal shrinkage of the materials with which the graphite structures are impregnated.

Another more specific, but nevertheless important, object of my invention resides in the provision of methods in accord with the preceding objects in which the artifact or component is made by impregnating the fine grained, isotropic graphite with a liquid impregnant containing furfural or furfural alcohol or a mixture thereof, an acid catalyst, and a polyol; heating the impregnated structure until polymerization occurs; and then pyrolyzing the organic constituents of the impregnant to produce a still finer grained carbon in the pores of the isotropic graphite.

A related, still more specific, object of my invention resides in the provision of methods in accord with the preceding object in which the impregnant contains furfural or furfural alcohol or a mixture thereof, para toluene sulfonic acid, and tetraethylene glycol.

Still other specific objects of my invention reside in the proision of impregnants of the composition identified in the two preceding objects; in the provision of fine grained, isotropic structures impregnated with such compositions and their polymerization products; and in the provision of components and artifacts obtained by pyrolyzing the organic constituents of the impregnant.

Other important objects, features, and advantages of my invention will become apparent to the reader from the foregoing, from the appended claims, and from the following examples with are intended only to illustrate, and not restrict, the scope of my invention as defined in the appended claims.

EXAMPLE I

A liquid impregnant was prepared by dissolving 142 gm of para toluene sulfonic acid in 560 ml of tetraethylene glycol Eight hundred (800) ml of furfural was added to this mixture while stirring it at room temperature for 10 minutes.

The pores of eight premachined Poco fine grained, isotropic graphite crucibles were filled with the liquid impregnant at room temperature. Specifically, the crucibles were placed in a chamber which was evaculated to 1 mm Hg pressure to remove the air from the pores of the graphite. The crucibles were then submerged in the liquid impregnant, and the pressure was raised back to 760 mm Hg. The crucibles were left standing in the liquid until it began to gel. This occurred after about 4 hours.

After gelling, the crucibles were removed; and the excess resin was wiped from their surfaces.

The crucibles were then placed in sand and held for 24 hours at 45° C. They were further heated for 3 days at 95° C. prior to carbonization.

The carbonization or pyrolyzation was carried out in flowing nitrogen with the temperature being gradually increased over a period of approximately 4 days to 700° C. The crucibles were heated further to 1,850° C. in 4 hours under vacuum.

The crucibles had a very smooth surface and a very uniform weight gain, averaging 7.95%. A metallographic examination showed a very uniform filling of the pores by a nongraphitic carbon with pores that could not be resolved in a light microscope. No cracks were found in the impregnated carbon.

EXAMPLE 2

Six machined rectangular blocks of fined grained, isotropic Poco graphite used for glass contact pads were impregnated and the impregnant carbonized in the manner described in Example 1. In this case there was a 3.23% weight gain. The surfaces of the pads had an improved finish, and the microstructure was uniform and free of cracks.

EXAMPLE 3

Two test blocks of the same Poco graphite identified in Example 2 were treated in the manner of Example 1 except that 50 volume % of furfural alcohol was substituted for the 60 volume % of furfural. The weight gain in this case was 3.05%, and the microstructure was comparable to that of the contact pads made by the process described in Example 2. The surface finish was improved over that possessed by the graphitic structures prior to impregnation.

Representative forms of my invention have been described above, but the invention may be embodied in other specific forms without departing from the spirit or essential characteristics thereof. The disclosed embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent of the United States is:

1. A method of producing a densified carbonaceous body with a superior surface finish, said method comprising the steps of: impregnating a permeable body composed essentially of a fine grained, isotropic graphite with a liquid impregnant containing furfural or furfural alcohol or a mixture thereof, an acid catalyst, and a glycol or mixture of glycols; heating the impregnated, permeable body to a temperature which is sufficiently high to polymerize the impregnant; and then heating said body to a temperature which is sufficiently high to carbonized the polymerized impregnant.

2. A method of producing a densified carbonaceous body as defined in claim 1 wherein the constituents of the liquid impregnant are present in the following proportions:

| Furfural, furfural alcohol, or mixture thereof | 40–85 Volume % |
|---|---|
| Acid catalyst | 2–20 Weight % of above mixture |
| Glycol | Balance |

3. A method of producing a densified carbonaceous body as defined in either of the preceding claims 1 or 2 wherein the acid catalyst constituent of the liquid impregnant is para toluene sulfonic, phosphoric, or hydrocholoric acid.

4. A method of producing a densified carbonaceous body as defined in either of the preceding claims 1 or 2 wherein the glycol constituent of the liquid impregnant is a polyethylene or polypropylene glycol.

5. A method of producing a densified carbonaceous body as defined in claim 4 wherein the glycol constituent of the liquid impregnant is tetraethylene glycol.

6. A structure which is capable of being converted into a densified carbonaceous artifact, said structure being composed of a body which is essentially a fine grained, isotropic carbon with the pores thereof filled with a liquid impregnant containing furfural and/or furfural alcohol, and acid polymerization catalyst, and one or more glycols or the polymerization products of an impregnant as aforesaid.

7. A structure as defined in claim 6 and capable of being converted into a densified carbonaceous body wherein the constituents of the impregnant are present in the following proportions:

| Furfural, furfural alcohol, or mixture thereof | 40–85 Volume % |
|---|---|
| Acid Catalyst | 2–20 Weight % of above mixture |
| Glycol | Balance |

8. A structure as defined in either of the preceding claims 6 or 7 and capable of being converted into a densified carbonaceous body wherein the acid catalyst constituent of the impregnant is para toluene sulfonic, phosphoric, or hydrochloric acid.

9. A structure as defined in either of the preceding claims 6 or 7 and capable of being converted into a desified carbonaceous body wherein the glycol constituent of the impregnant is a polyethylene or polypropylene glycol.

10. A structure as defined in claim 9 and capable of being converted into a densified carbonaceous body wherein the glycol constituent of the liquid impregnant is tetraethylene glycol.

* * * * *